(12) United States Patent
Millington

(10) Patent No.: US 6,178,380 B1
(45) Date of Patent: Jan. 23, 2001

(54) STREET IDENTIFICATION FOR A MAP ZOOM OF A NAVIGATION SYSTEM

(75) Inventor: Jeffrey Alan Millington, Rochester Hills, MI (US)

(73) Assignee: Magellan, DIS, Inc., Rochester Hills, MI (US)

( * ) Notice: Under 35 U.S.C. 154(b), the term of this patent shall be extended for 0 days.

(21) Appl. No.: 09/176,630

(22) Filed: Oct. 22, 1998

(51) Int. Cl.[7] .................. G08G 1/0969; G09B 29/00; G01C 21/00
(52) U.S. Cl. .................. 701/212; 701/208; 701/211; 340/990; 340/995
(58) Field of Search .................. 701/25, 201, 208, 701/211, 212; 340/990, 995

(56) References Cited

U.S. PATENT DOCUMENTS

| | | |
|---|---|---|
| 4,914,605 | 4/1990 | Loughmiller, Jr. et al. . |
| 5,285,391 | 2/1994 | Smith, Jr. et al. . |
| 5,398,188 | 3/1995 | Maruyama . |
| 5,617,319 | 4/1997 | Arakawa et al. .................. 364/449.1 |
| 5,974,357 | * 10/1999 | Poonsaengsathit et al. ......... 701/210 |
| 6,067,502 | * 5/2000 | Hayashida et al. .................. 701/212 |

FOREIGN PATENT DOCUMENTS

| | | |
|---|---|---|
| 0306088 | 3/1989 | (EP) . |
| 0838662 | 4/1998 | (EP) . |
| 07270172 | 10/1995 | (JP) . |
| 08145701 | 6/1996 | (JP) . |
| 08145708 | 6/1996 | (JP) . |

\* cited by examiner

*Primary Examiner*—Ian J. Lobo
(74) *Attorney, Agent, or Firm*—Carlson, Gaskey & Olds

(57) ABSTRACT

A vehicle location display for a navigation or route guidance system is disclosed. The vehicle location display provides information to a user regarding the current location of the vehicle on a map even when the scale of the map is large. In a preferred embodiment, the map includes a current location field that displays a road segment name associated with the current road segment that the vehicle is located on. In an alternative embodiment, the vehicle location display displays a large scale map wherein the current road segment is highlighted by displaying it in a color and the name of the current road segment is displayed in a current location field on the map.

31 Claims, 5 Drawing Sheets

STREET IDENTIFICATION FOR A MAP ZOOM OF A NAVIGATION SYSTEM

BACKGROUND OF THE INVENTION

This invention relates generally to a navigation or route guidance system and, more particularly, to a vehicle location display for a route guidance system.

Navigation systems generally provide a recommended route from a starting point to a desired destination. Generally, the starting point and desired destination are selected from a large database of roads stored in a mass media storage, such as a CD ROM or hard drive, which includes the roads in the area to be travelled by the user. The navigation system can be located in a personal computer or it can be installed in a vehicle. If the navigation system is installed in a vehicle, the starting point is typically the current position of the vehicle, which can be input to the navigation system by an associated position determining system that usually includes a GPS (Global Positioning System) receiver.

The navigation system determines a route from the starting point to the destination utilizing an algorithm well-known to those in the art and currently in use in many navigation systems. Usually there are many potential routes between the selected starting point and the desired destination. Typical navigation systems select a recommended route based upon certain "cost" values associated with each segment of road in the road database. These cost values include the length of the road segment and the estimated time of travel through the road segment. The navigation system selects the potential route with the lowest total cost to be the recommended route. Depending upon the predetermined algorithm of the navigation system, the navigation system will recommend the route with the shortest total length, the lowest total time, or some weighted average of length and time.

The recommended route is then displayed to the user as a map showing the starting point, desired destination and highlighting the recommended route. Preferably, if the navigation system is installed in a vehicle, the navigation system displays the current location of the vehicle and provides turn-by-turn instructions to the driver, guiding the driver to the selected destination.

The typical navigation system provides the current vehicle location to the user by displaying either a textual guidance mode screen having a set of instructions and the current location or a guidance mode map showing the starting point, desired destination, current location and highlighting the recommended route. When a user has not determined a route, the typical navigation system displays a map showing the current vehicle location and all of the surrounding streets. Such a system is described in U.S. Pat. No. 6,049,755 filed Jul. 13, 1998, which claims benefit of provisional application Ser. No. 60/084,292, filed May 5, 1998. The disclosures of U.S. Pat. No. 6,049,755 and 60/084,292 referenced above are hereby incorporated by reference in full.

The typical navigation system also permits a user to adjust the scale of a displayed map. Frequently a user desires to "zoom out" by increasing the map scale to enable the user to see a larger area of the database. One disadvantage of current map zoom functions is that when a user zooms out it can be difficult, because of the complexity of a larger scale map, to see the current vehicle location on the large scale map. Also, in a current navigation system when a smaller scale map is displayed the user is provided with the name of streets on the map, this information can not be provided on the larger scale display.

The typical navigation system also permits a user to pan the map to areas other than the current location. One disadvantage when panning a large scale map is that the user is not provided with a street name of a panned street.

Thus, it is desirable to provide a vehicle location display for a navigation system that permits a user to alter the scale of a displayed map to a large scale while still providing the user with information concerning the current vehicle location. In addition, it is desirable to provide information to a user regarding a panned street when the scale of a displayed map is large.

SUMMARY OF THE INVENTION

In general terms, this invention provides a vehicle location display for a navigation system.

In one embodiment the vehicle location display comprises a database of a plurality of road segments each having an associated road segment name. The vehicle location display also includes a display that displays a map at a variable scale and comprising a plurality of the road segments including the current road segment. The display displays an associated road segment name adjacent the current road segment when the variable scale is below a threshold scale. The display displays the associated road segment name of the current road segment in a current location field on the display not adjacent the current road segment when the scale is above the threshold scale.

In a preferred embodiment the vehicle location display accents the current road segment and the associated road segment name when the variable scale is above the threshold scale by displaying them in a first color on the display. In a most preferred embodiment the vehicle location display includes a map scaler that adjusts the scale of the map in response to input from a user input device.

These and other features and advantages of this invention will become more apparent to those skilled in the art from the following detailed description of the presently preferred embodiment. The drawings that accompany the detailed description can be described as follows.

DETAILED DESCRIPTION OF THE PREFERRED EMBODIMENT

Figure 1:
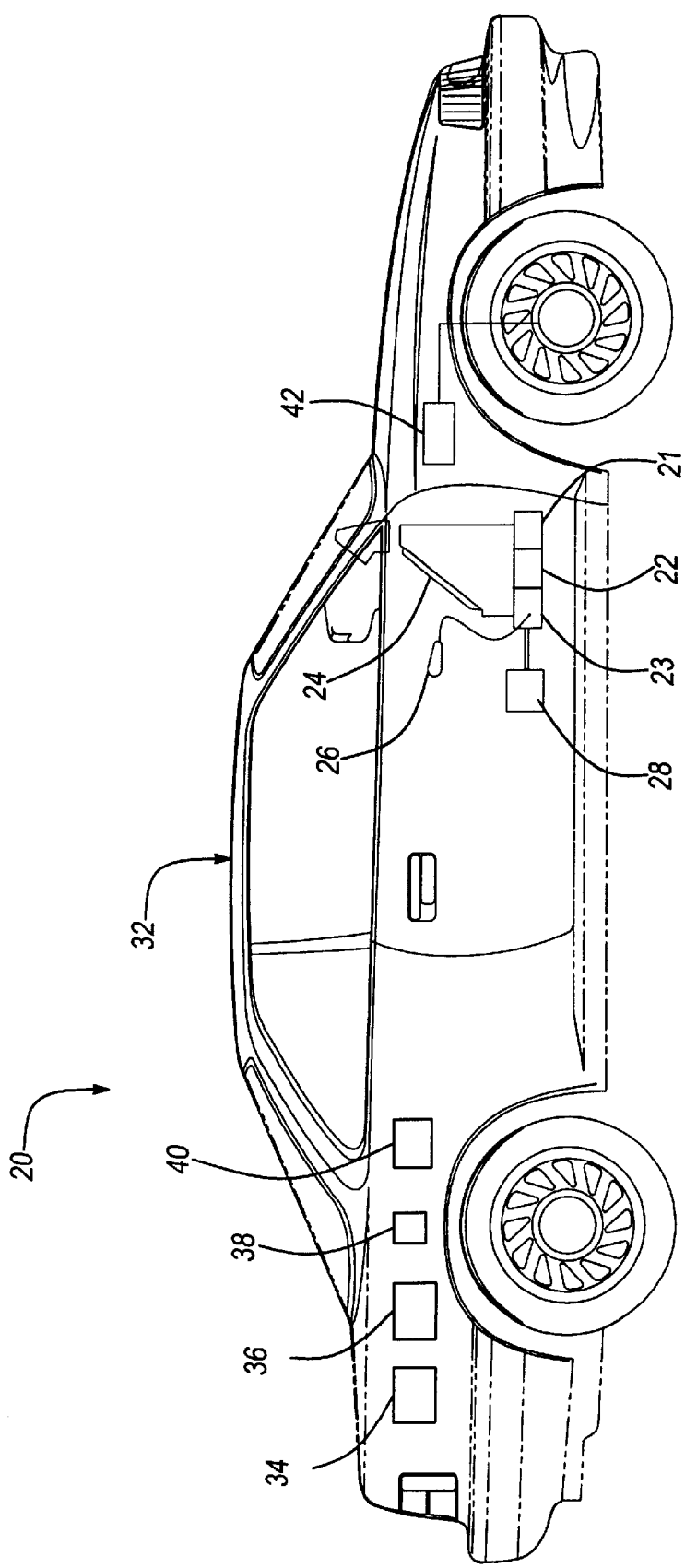
FIG. 1 is a schematic of a navigation system with a vehicle location display designed according to the present invention installed in a vehicle.

The navigation system 20 of the present invention is shown schematically in FIG. 1. The navigation system 20 includes a CPU 22 (Central Processing Unit) having a route determination system 21 and a map scaler 23. Preferably, the route determination system 21 and the map scaler 23 are implemented in software on the CPU 22. The CPU 22 is connected to a display device 24, such as a high resolution LCD or flat panel display. The CPU 22 is also connected to a user input device 26. The navigation system 20 further includes a database 28 connected to the CPU 22. The database 28 is a mass media storage device, such as a CD ROM or hard drive, which includes data of all the roads in the area to be travelled by the user. The navigation system 20 can display a map on display device 24 based on the data in the database 28. The scale of the map, for example 1:265,000, is a variable scale that can be altered by a user through the user input device 26 and the map scaler 23.

Each road in the database is divided into road segments, each having an associated set of cost values, which indicate the "cost" of traveling that road segment. For example, the cost values may include the length of the road segment, the estimated time to travel the road segment, and the type of road (i.e., highway, secondary road, toll road, one way, etc.). Each road segment also has a road segment name associated with it. Generally, each road segment comprises the portion of a road between adjacent cross roads to the road.

Using algorithms well known in the art, route determination system 21 determines a route on the road segments from a beginning point to a user selected destination point. Preferably, the beginning point is the current vehicle location as determined by the CPU 22 and one of the position determining devices discussed below. The determined route is preferably based on the cost values. Preferably, the navigation system 20 displays the determined route on display device 24 and provides turn by turn instructions to the user.

Each road segment in the database 28 has a rank associated with it. The rank, for example, may be a number from zero to four, with four being the highest rank. The rank of a road segment is determined by a number of factors including: road geometry, such as the number of lanes; speed limit of the road segment; and type of road segment, such as freeway, primary street or subdivision street. Generally, the rank divides road segments from highest rank to lowest rank into a freeway, a primary street, a secondary street, and a subdivision street with a freeway being the highest rank. The rank of a given road segment can not be altered by a user. The CPU 22 associates a unique rank color with each of the ranks. The display device displays each road segment in its associated rank color. Thus, for example, a highway, which has the highest rank may have a rank color of red and a subdivision street, which has the lowest rank may have a rank color of gray.

The navigation system 20 can, but need not, be installed in a vehicle 32. The navigation system can be used in conjunction with position determining devices, such as a GPS receiver 34, a gyroscope 36, a compass 38, an orthogonal multi-axis accelerometer 40 and a vehicle speed sensor 42, all connected to the CPU 22 (connections not shown for simplicity). Such position determining devices are well-known and are commercially available. Preferably, a combination of these position determining devices is utilized. Using known software algorithms and technologies, such as dead-reckoning or map-matching or others, the CPU 22 in combination with the position determining device comprises a position determining system that determines the current position of the navigation system 20 or the vehicle 32 relative to the map database 28. The current position determination includes a determination of a current road segment and a current vehicle location on the current road segment.

Figure 2:
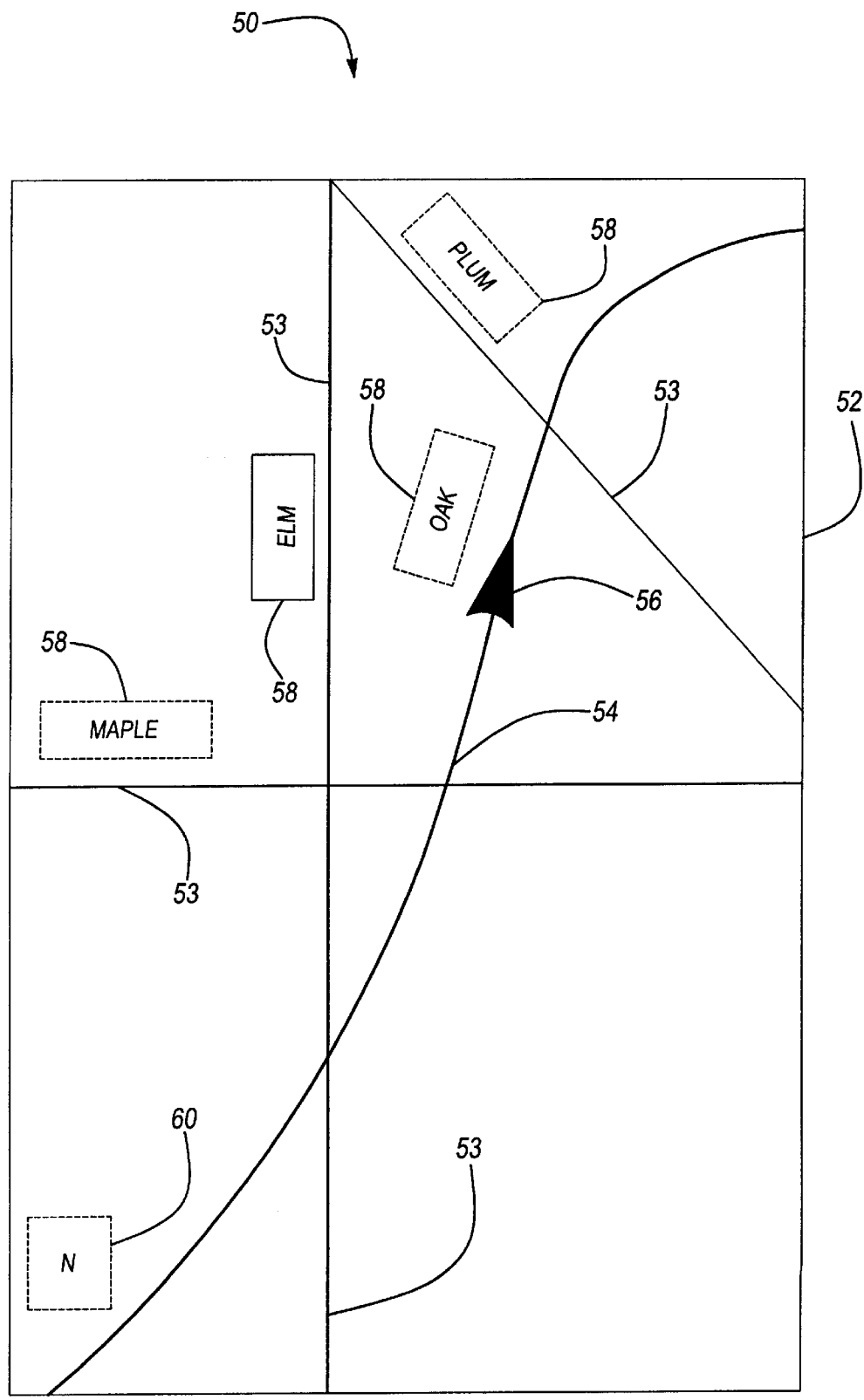
FIG. 2 is a screen display of one embodiment of the vehicle location display illustrating a map having a scale below a threshold scale.

FIG. 2 is a screen display of one embodiment of a vehicle location display shown generally at 50. Vehicle location display 50 includes a map 52 displayed on display device 24. Map 52 is comprised of a plurality of road segments 53 and includes a current road segment 54, which is determined by the position determining system, described above. A vehicle cursor 56 is located at a current vehicle location, also determined by the position determining system, on current road segment 54. A road segment name field 58, shown in phantom, is located adjacent at least one road segment 53 of each road including current road segment 54. A road segment name associated with the adjacent road segment 53 is displayed in each road segment name field 58. Vehicle location display 50 also includes a current heading field 60, shown in phantom, that displays a current compass heading of vehicle 32. As discussed above, map 52 is comprised of a plurality of road segments 53, generally each road segment 53 comprises the portion of a road between adjacent cross roads of that road. If there is a long distance between cross roads, then a road segment may be a portion of a road that is not defined by cross roads. Preferably each road segment 53, and the current road segment 54 are displayed in their associated rank color, described above. In FIG. 2 the scale of map 52 is below a threshold scale, thus vehicle location display 50 operates in a first mode and map 52 displays associated names in the road segment name fields 58. The threshold scale is preferably set at a scale that displays a map 52 that is not overly complex or detailed and represents a fully zoomed in view.

Figure 3:
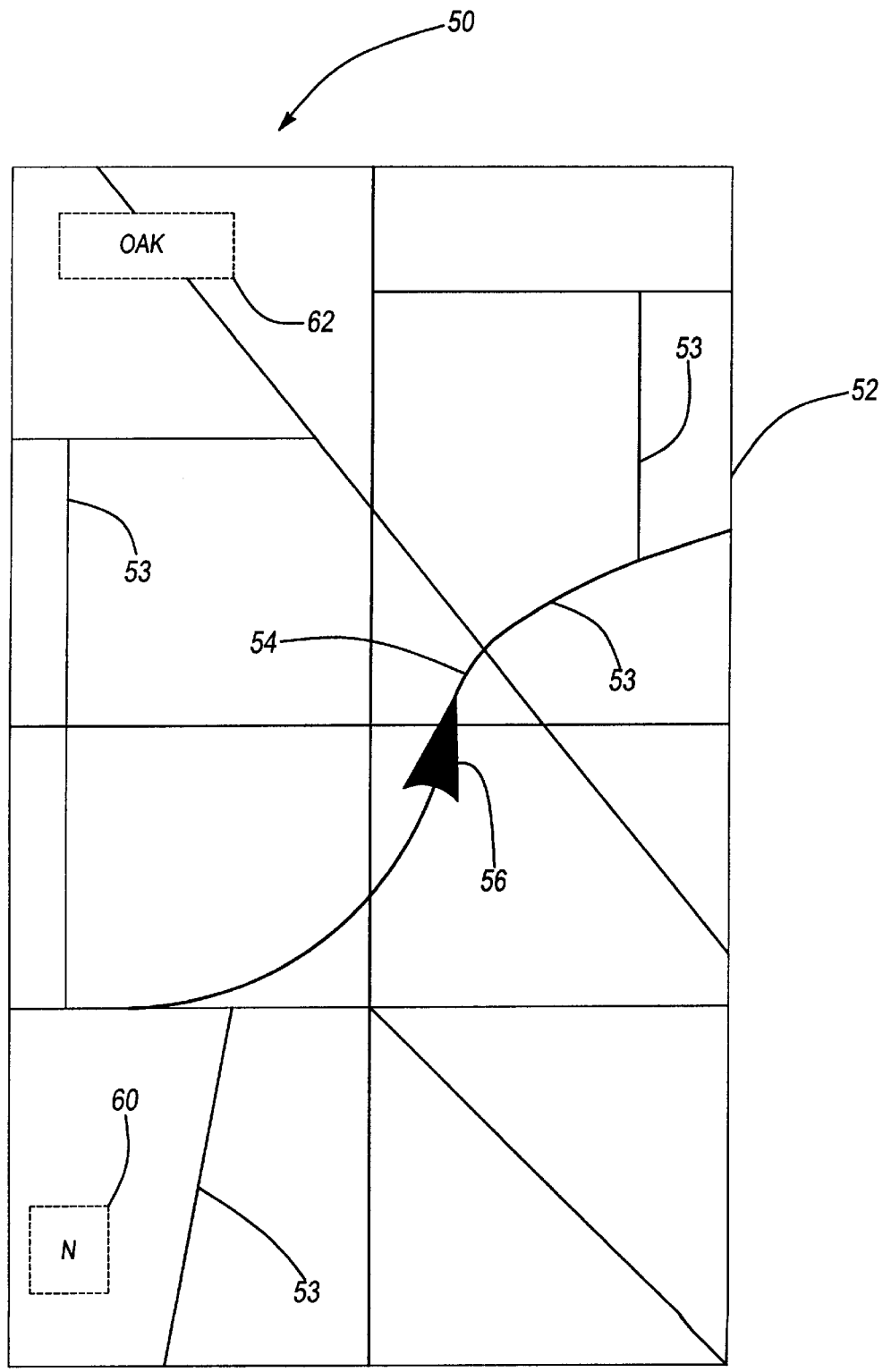
FIG. 3 is a screen display of the vehicle location display shown in FIG. 2 when the map has a scale above the threshold scale.

In FIG. 3 vehicle location display 50 is shown when the scale of map 52 is above the threshold scale, in other words, the user has zoomed out The scale of map 52 is variable and can be adjusted through user input device 26 and map scaler 23. When the scale of map 52 exceeds the threshold scale vehicle location display 50 operates in a second mode and further includes a current location field 62. Current location field 62 displays the road segment name associated with current road segment 54. Preferably, when the variable scale exceeds the threshold scale map 52 no longer displays the associated names in the current road segment name field 58.

When map 52 is at a scale above the threshold scale the current road segment 54 is accented or highlighted. Preferably, current road segment 54 is accented by displaying current road segment 54 in a first color wherein the first color is not one of the rank colors, described above. Accenting could also comprise flashing current road segment 54 or changing its intensity. Preferably, first color comprises a magenta color. In addition, preferably the road segment name associated with current road segment 54 is displayed in current location field 62 in the first color. Preferably the current location field 62 is displayed in a fixed location on display device 24 that is independent of the location of vehicle cursor 56 and current road segment 54.

Figure 4:
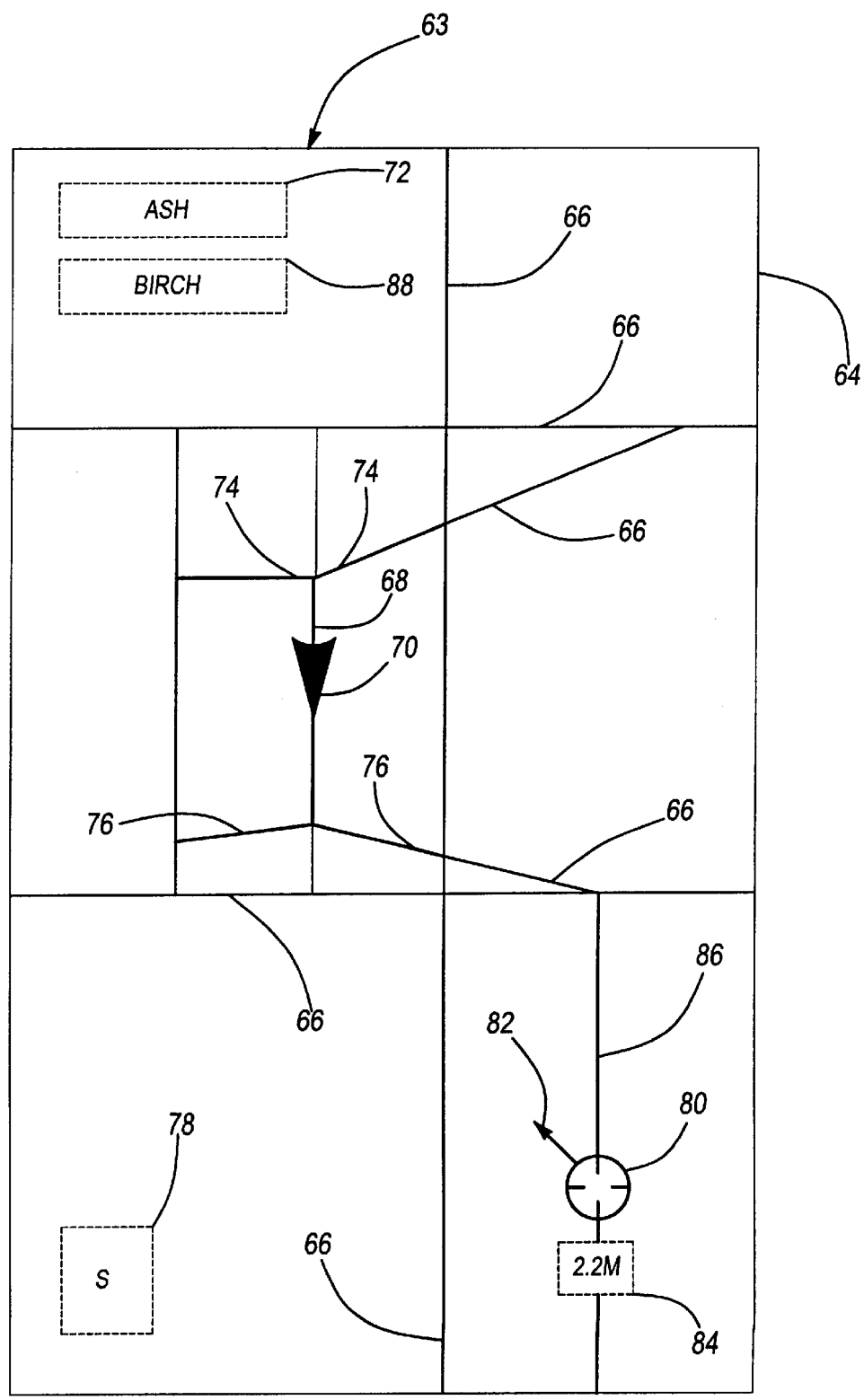
FIG. 4 is a screen display of another embodiment of the vehicle location display illustrating a map having a scale above the threshold scale.

FIG. 4 is display device 24 showing another embodiment of a vehicle location display 63 operating in the second mode when the scale exceeds a threshold scale. In FIG. 4 vehicle location display 63 includes a map 64 comprised of a plurality of road segments 66, 68, 74, 76, and 86 including a current road segment 68. Preferably road segments 66 are displayed in their associated rank color. A vehicle cursor 70 is located on current road segment 68 at the current vehicle location as determined by the position determining system, described above. The scale of map 64 as shown is above the threshold scale, and thus the road segment names are not displayed adjacent any of road segments 66. Map 64 includes a current location field 72 which displays the road segment name associated with current road segment 68.

Preferably, current location field 72 is displayed in a fixed location on display device 24. Current road segment 68 is accented or highlighted, preferably, by displaying current road segment 68 in the first color, described above, wherein the first color is not one of the rank colors. In addition, current road segment name is displayed in current location field 72 in the first color.

A previous cross street 74 and a next cross street 76, selected based on the database 28 and the current vehicle location, are also displayed on map 64. As used in this specification and the accompanying claims, a cross street is defined as a street that is connected to the current road segment 68 in any fashion or that crosses over or under the current road segment 68. In FIG. 4, both the previous cross street 74 and the next cross street 76 are connected to the current road segment 68. A portion of both the previous cross street 74 and next cross street 76 are accented on map 64. Preferably, the portions of previous cross street 74 and next cross street 76 are accented by displaying them in a second color, wherein the second color is different from the first color and the rank colors. Most preferably the portions are displayed in a turquoise color. A current heading field 78 displays the current compass heading of the vehicle 32.

Map 64 further includes a map panning cursor 80. Through user input device 26 a user can pan map panning cursor 80 over map 64. Map panning cursor 80 includes a directional indicator 82 that points toward vehicle cursor 70 relative to map panning cursor 80. The directional indicator 82 is updated as the user pans over map 64. A distance field 84 shows the distance between the map panning cursor 80 and the current vehicle location. A user can select to have distance field 84 display the distance as either the straight line distance or the distance between map panning cursor 80 and the vehicle cursor 70 on a determined route. The map panning cursor 80 is more fully described in co-pending U.S. patent application Ser. No. 09/100,683, allowed, filed Jun. 19, 1998, which claims benefit of U.S. Provisional application Ser. No. 60/084,294, filed May 5, 1998. Both U.S. patent application Ser. No. 09/100,683, filed Jun. 19, 1998, and Provisional application Ser. No. 60/084,294, filed May 5, 1998 are hereby incorporated in full by reference.

The CPU 22 continuously calculates the heading between the map panning cursor 80 and the vehicle cursor 70 using the latitude and longitude coordinates of each. In addition, the CPU 22 continuously calculates the distance between the map panning cursor 80 and the current vehicle location either on a straight line basis or on a determined route.

Based on the heading calculated between the map panning cursor 80 and the vehicle cursor 70, the CPU 22 indexes an array of pre-rendered bitmap symbols that define the position of the directional indicator 82 on the map panning cursor 80 and displays the bitmap symbol on map 64. Preferably, the array of pre-rendered bitmaps includes at least eight bitmaps one each for the compass headings of north, northeast, east, southeast, south, southwest, west and northwest. Thus, a heading of approximately 315° between the map panning cursor 80 and the vehicle cursor 70 is represented by a bitmap having the directional indicator 82 positioned as shown in FIG. 4. When the heading changes, due to a change in the location of either the vehicle cursor 70 or the map panning cursor 80, the CPU 22 indexes the array and displays a new bitmap as appropriate.

Most preferably, each bitmap would correspond to a range of compass headings. By way of example, a heading between approximately 337.5° to 22.5° would correspond to a directional indicator positioned at a compass position of north on the map panning cursor 80. As would be understood by one of ordinary skill in the art, the number of pre-rendered bitmaps could be much larger than the eight compass headings described above to provide higher resolution of the heading.

When map panning cursor 80 is panned over a road segment 66 that road segment becomes a panned road segment 86. Panned road segment 86 is accented on map 64. Preferably, panned road segment 86 is accented by displaying panned road segment 86 in a pan color, wherein the pan color is not the first color, second color or any of the rank colors. Preferably the panned color is a yellow. Map 64 further includes a panned road segment field 88. The road segment name associated with panned road segment 86 is displayed in panned road segment field 88, preferably in the pan color. Preferably the panned road segment field 88 is displayed in a fixed location adjacent current location field 72 independent of panned road segment 86 location.

Figure 5:
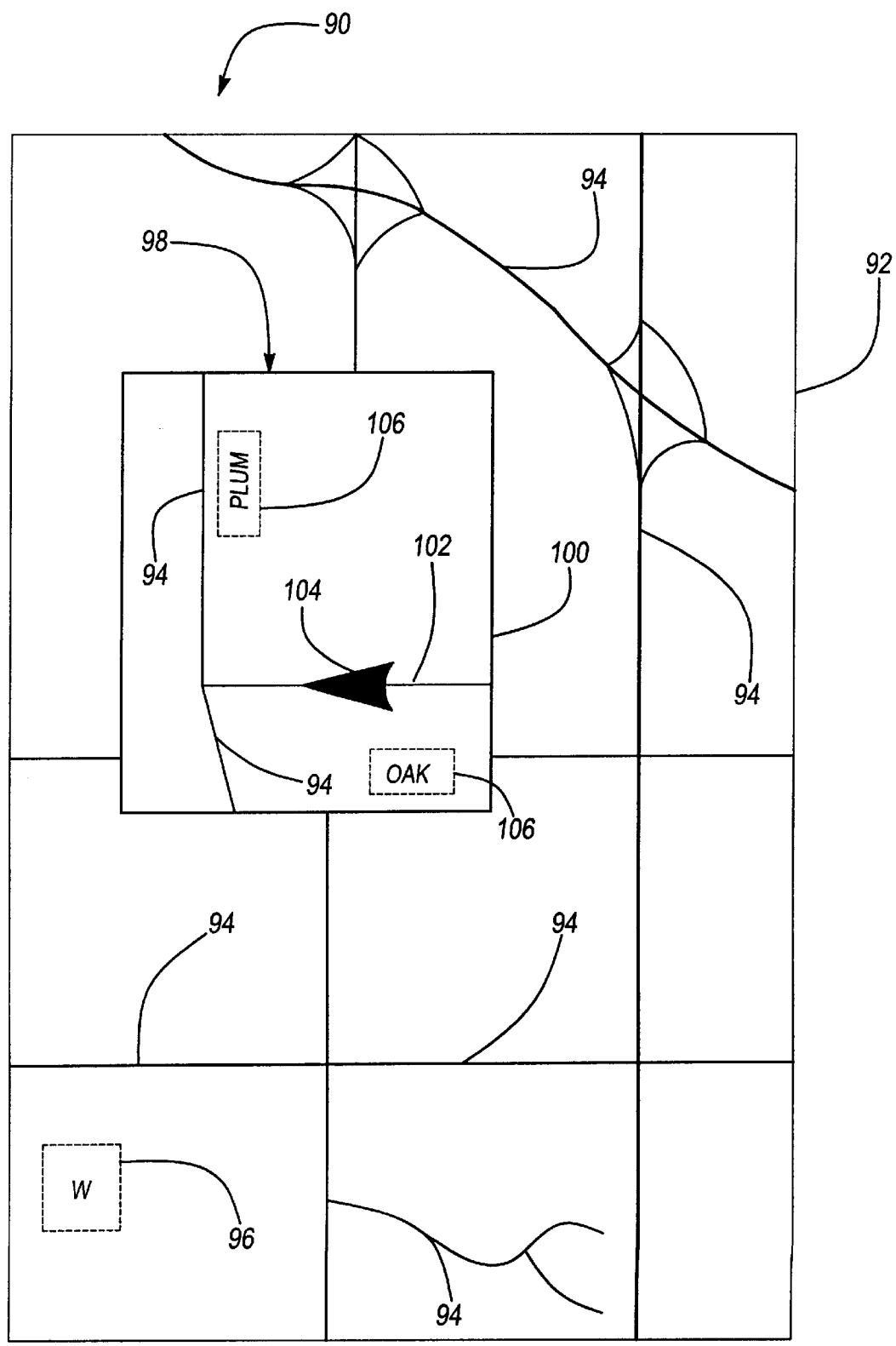
FIG. 5 is a screen display of another embodiment of the vehicle location display illustrating a second map within a first map when the first map has a scale above the threshold scale.

FIG. 5 shows display device 24 displaying another embodiment of a vehicle location display 90. Vehicle location display 90 includes a first map 92 having a variable first scale that displays a plurality of road segments 94 based on a current vehicle location and database 28. Road segments 94 are preferably displayed in the rank color associated with their rank. Vehicle location device 90 also includes a current heading field 96 which displays the current compass heading of vehicle 32.

When the first scale of first map 92 exceeds a threshold scale vehicle location device 90 displays in a second mode that includes a second map 98 displayed within first map 92. Thus, in FIG. 5 the first scale of first map 92 is above the threshold scale. As would be understood by one of ordinary skill in the art, second map 98 does not need to be displayed within first map 92. Second map 98 could be displayed adjacent first map 92. The second map 98 displays, at a lower scale, a portion of first map 92 including a current road segment 102. Generally, second map 98 moves around first map 92 as the current vehicle location changes so that a vehicle cursor 104 remains displayed in second map 98. Second map 98 includes a border 100 surrounding second map 98. Preferably, the color of border 100 is selected to contrast with the rank colors. Within second map 98 a plurality of road segments 94 are displayed, including the current road segment 102. Current road segment 102 also includes the vehicle cursor 104 located at the current vehicle location on current road segment 102. Adjacent road segments 94 and current road segment 102 in second map 98 are road segment name fields 106, which display the road segment names associated with each. The scale of second map 98 is below the threshold scale.

Most preferably, map scaler 23 enables a user to select from a plurality of scales to go from fully zoomed in to fully zoomed out. Preferably the threshold scale is set at the most zoomed in scale. As a user zooms out beyond the threshold scale vehicle location displays 50, 63, and 90 first stop displaying road segment names, then they stop displaying lower rank road segments, finally, at highest zoom out, only high ranking road segments are displayed in addition to the current, panned, and cross road segments.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

I claim:

1. A vehicle location display of a navigation system comprising:
   a database of a plurality of road segments each having an associated road segment name;
   a display displaying a map at a variable scale, said map comprising a plurality of said road segments including a current road segment;
   said display displaying an associated road segment name adjacent said current road segment when said variable scale is below a threshold scale;
   said display displaying said associated road segment name of said current road segment in a current location field on said display not adjacent said current road segment when said variable scale is above said threshold scale.

2. A vehicle location display of a navigation system as recited in claim 1 further including a position determining system, said position determining system determining said current road segment and a current vehicle location on said current road segment; and
   said display displaying a vehicle cursor at said current vehicle location.

3. A vehicle location display of a navigation system as recited in claim 1 further including a user input device; and
   a map scaler, said map scaler changing said variable scale of said map in response to input from said user input device.

4. A vehicle location display of a navigation system as recited in claim 1 wherein said current location field is in a fixed location on said display independent of the location of said current road segment on said display.

5. A vehicle location display of a navigation system as recited in claim 1 wherein said display accents said current road segment when said variable scale is above said threshold scale.

6. A vehicle location display of a navigation system as recited in claim 5 wherein accenting said current road segment includes displaying said current road segment in a first color different from the color of other road segments; and
   said display displaying said associated road segment name of said current road segment in said current location field in said first color when said variable scale is above said threshold scale.

7. A vehicle location display of a navigation system as recited in claim 6 further comprising:
   said database including a plurality of ranks, each of said ranks associated with at least one of said road segments;
   each of said ranks associated with one of a plurality of rank colors, none of said plurality of rank colors being said first color;
   said display displaying each of said road segments except said current road segment of said map in an associated rank color.

8. A vehicle location display of a navigation system as recited in claim 1 further comprising:
   a previous cross street and a next cross street of said current road segment;
   said display accenting a portion of said previous cross street and said next cross street.

9. A vehicle location display of a navigation system as recited in claim 8 wherein accenting said portion of said previous cross street and said next cross street includes displaying said portion of said previous cross street and said next cross street in a second color different from the color of other road segments.

10. A vehicle location display of a navigation system as recited in claim 1 further including a map panning cursor, said map panning cursor movable about said map in response to input from a user input device; and
    said display accenting a panned road segment, said panned road segment selected with said map panning cursor.

11. A vehicle location display of a navigation system as recited in claim 10 wherein accenting said panned road segment comprises displaying said panned road segment in a pan color different from the color of other road segments.

12. A vehicle location display of a navigation system as recited in claim 10 wherein said display displays said road segment name associated with said panned road segment in a panned road segment field on said display in a pan color when said scale is above said threshold scale.

13. A vehicle location display of a navigation system as recited in claim 10 wherein said map panning cursor includes a directional indicator, said directional indicator indicating a direction from said map panning cursor to a current vehicle location.

14. A vehicle location display of a navigation system as recited in claim 10 wherein said display displays a distance field, said distance field displaying a distance between said map panning cursor and a current vehicle location.

15. A vehicle location display of a navigation system as recited in claim 1 wherein said display further includes a current heading field, said current heading field displaying a current compass heading of a vehicle.

16. The vehicle location display of a navigation system as recited in claim 1 wherein the display does not display the associated road segment name adjacent the current road segment when the variable scale is above a threshold scale.

17. The vehicle location display of a navigation system of claim 16 wherein the display does not display the associated road name of the current road segment in the current location field when the variable scale is below said threshold scale.

18. A vehicle location display of a navigation system comprising:
    a database of a plurality of road segments;
    a position determining system, said position determining system determining a current road segment and a current vehicle location on said current road segment;
    a display displaying a first map at a first scale and comprising a plurality of said road segments including said current road segment;
    said display displaying a second map and said first map simultaneously, said second map comprising a plurality of said road segments including said current road segment, said second map having a second scale less than said first scale.

19. A vehicle location display of a navigation system as recited in claim 18 further comprising:
    a user input device; and
    a map scaler, said map scaler changing said first scale of said first map in response to input from said user input device.

20. A vehicle location display of a navigation system as recited in claim 18 wherein said display displays a road segment name adjacent said current road segment and a vehicle cursor at said current vehicle location on said first map when said first scale of said first map is below a threshold scale.

21. A vehicle location display of a navigation system as recited in claim 18 wherein said display displays a road segment name adjacent said current road segment on said second map.

22. A vehicle location display of a navigation system as recited in claim 18 wherein said display displays said second map within said first map.

23. A vehicle location display of a navigation system as recited in claim 18 further comprising:

said database including a plurality of ranks, each of said ranks associated with at least one of said road segments;

each of said ranks associated with one of a plurality of rank colors;

said display displaying each of said road segments of said first map and said second map in an associated rank color.

24. A vehicle location display of a navigation system as recited in claim 18 wherein said second map further includes a border, said border surrounding said second map and having a color other than said plurality of rank colors.

25. A vehicle location display of a navigation system as recited in claim 18 wherein said display further includes a current heading field, said current heading field displaying a current compass heading of a vehicle.

26. A method for displaying a current vehicle location on a display of a navigation system comprising the steps of:

a.) determining a current vehicle location relative to a database of road segments;

b.) displaying a plurality of said road segments and said current vehicle location;

c.) adjusting a scale of said display; and d.) displaying in a first mode when said scale is below a threshold scale and displaying in a second mode when said scale is above said threshold.

27. A method as recited in claim 26 wherein:

step b.) further comprises displaying said plurality of said road segments and said current vehicle location on a map;

step c.) further comprises adjusting a scale of said map; and step d.) further comprises in said first mode displaying a road segment name associated with said current vehicle location adjacent said current vehicle location and in said second mode displaying said road segment name associated with said current vehicle location in a current location field.

28. A method as recited in claim 26 wherein:

step b.) further comprises displaying said plurality of said road segments and said current vehicle location on a first map;

step c.) further comprises adjusting a scale of said first map; and step d.) further comprises in said first mode displaying on said first map said current vehicle location and in said second mode displaying said first map and a second map, said second map having a scale below said threshold and including said current vehicle location.

29. A vehicle location display of a navigation system comprising:

a database of a plurality of road segments;

a position determining system, said position determining system determining a current vehicle location relative to said database;

a display having a variable scale and displaying a plurality of said road segments and said current vehicle location in a first mode when said variable scale is below a threshold and displaying a plurality of said road segments and said current vehicle location in a second mode when said variable scale is above a threshold.

30. A vehicle location display of a navigation system as recited in claim 29 wherein said display displays a map including said plurality of said road segments and said current vehicle location;

in said first mode said display displays an associated road segment name adjacent said current vehicle location on said map; and in said second mode said display displays said associated road segment name in a current location field on said display.

31. A vehicle location display of a navigation system as recited in claim 29 wherein:

said display displays a first map at said variable scale and including said plurality of said road segments and said current vehicle location when said display is in said first mode; and said display displaying a second map and said first map when said display is in said second mode, said second map comprising a plurality of said road segments including said current road segment and a vehicle cursor displayed at said current vehicle location, said second map having a scale less than said threshold scale.

* * * * *

(12) EX PARTE REEXAMINATION CERTIFICATE (9606th)
United States Patent
Millington

(10) Number: US 6,178,380 C1
(45) Certificate Issued: Apr. 23, 2013

(54) STREET IDENTIFICATION FOR A MAP ZOOM OF A NAVIGATION SYSTEM

(75) Inventor: Jeffrey Alan Millington, Rochester Hills, MI (US)

(73) Assignee: Beacon Navigation GmbH, Zug (CH)

Reexamination Request:
No. 90/012,047, Dec. 13, 2011

Reexamination Certificate for:
Patent No.: 6,178,380
Issued: Jan. 23, 2001
Appl. No.: 09/176,630
Filed: Oct. 22, 1998

(51) Int. Cl.
*G08G 1/123* (2006.01)

(52) U.S. Cl.
USPC ...... 701/455; 340/990; 340/995.15; 701/429; 701/431

(58) Field of Classification Search .................. None
See application file for complete search history.

(56) References Cited

To view the complete listing of prior art documents cited during the proceeding for Reexamination Control Number 90/012,047, please refer to the USPTO's public Patent Application Information Retrieval (PAIR) system under the Display References tab.

*Primary Examiner* — Dennis Bonshock

(57) ABSTRACT

A vehicle location display for a navigation or route guidance system is disclosed. The vehicle location display provides information to a user regarding the current location of the vehicle on a map even when the scale of the map is large. In a preferred embodiment, the map includes a current location field that displays a road segment name associated with the current road segment that the vehicle is located on. In an alternative embodiment, the vehicle location display displays a large scale map wherein the current road segment is highlighted by displaying it in a color and the name of the current road segment is displayed in a current location field on the map.

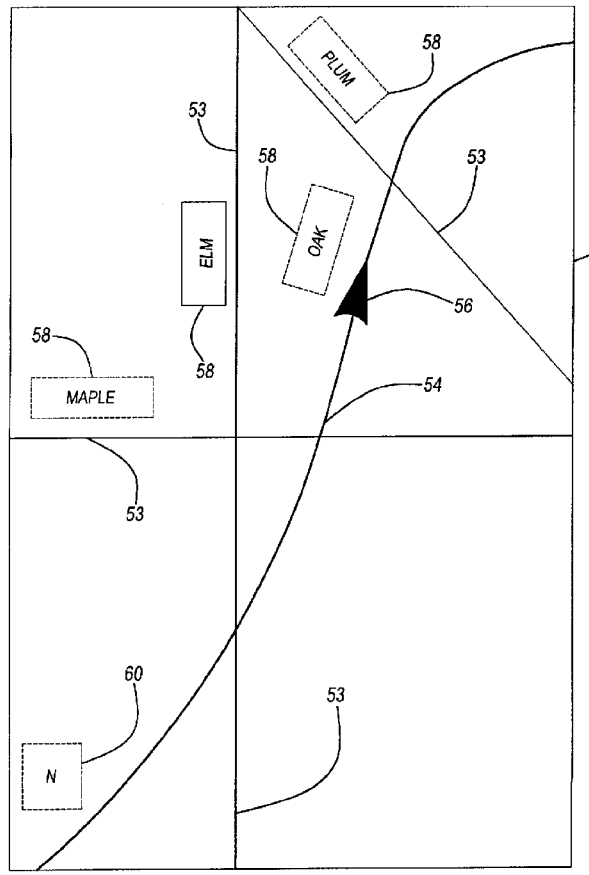

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1, 26 and 29 are cancelled.

Claims 2-25, 27, 28, 30 and 31 were not reexamined.

* * * * *